US008482635B2

(12) United States Patent
Peters et al.

(10) Patent No.: US 8,482,635 B2
(45) Date of Patent: Jul. 9, 2013

(54) SYSTEM, APPARATUS, SOFTWARE AND PROCESS FOR INTEGRATING VIDEO IMAGES

(75) Inventors: David S. Peters, Orlando, FL (US); Scott Zellner, Orlando, FL (US); Dedrick Duckett, Orlando, FL (US)

(73) Assignee: Popnoggins, LLC, Orlando, FL (US)

( * ) Notice: Subject to any disclaimer, the term of this patent is extended or adjusted under 35 U.S.C. 154(b) by 11 days.

(21) Appl. No.: 12/301,117

(22) PCT Filed: Sep. 15, 2008

(86) PCT No.: PCT/US2008/076382
§ 371 (c)(1),
(2), (4) Date: Nov. 17, 2008

(87) PCT Pub. No.: WO2009/036415
PCT Pub. Date: Mar. 19, 2009

(65) Prior Publication Data
US 2010/0171848 A1    Jul. 8, 2010

Related U.S. Application Data

(60) Provisional application No. 61/033,863, filed on Mar. 5, 2008.

(51) Int. Cl.
*H04N 5/262* (2006.01)
(52) U.S. Cl.
USPC .......................................................... 348/239
(58) Field of Classification Search
USPC ............................. 348/239; 345/473; 386/244
See application file for complete search history.

(56) References Cited

U.S. PATENT DOCUMENTS

| 5,623,587 | A   | 4/1997  | Bulman              |
|-----------|-----|---------|---------------------|
| 5,764,306 | A   | 6/1998  | Steffano            |
| 5,920,659 | A   | 7/1999  | Iverson et al.      |
| 6,020,931 | A   | 2/2000  | Bilbrey et al.      |
| 6,351,265 | B1  | 2/2002  | Bulman              |
| 6,400,374 | B2  | 6/2002  | Lanier              |
| 6,409,599 | B1  | 6/2002  | Sprout et al.       |
| 7,742,084 | B2* | 6/2010  | Ward et al. ........... 348/231.3 |
| 7,847,836 | B2* | 12/2010 | Silverbrook ........... 348/239 |
| 7,848,615 | B2* | 12/2010 | Tsai et al. ........... 386/244 |
| 7,999,862 | B2* | 8/2011  | Mack et al. ........... 348/239 |

(Continued)

OTHER PUBLICATIONS

Balasuriya et al., "Frontal View Human Face Detection and Recognition", Department of Statistics and Computer Science, University of Colombo, Sri Lanka, (extract not dated).

*Primary Examiner* — Tuan Ho
(74) *Attorney, Agent, or Firm* — Allen, Dyer, Doppelt, Milbrath & Gilchrist, P.A.

(57) ABSTRACT

A process for integrating video images includes generating a dancer video with a dancer and identifying a dancer head position of the dancer in the dancer video. A participant head location is identified and a cropped area is generated based on the participant head location. A participant video is generated of cropped area contents and a composite video is generated by overlaying the cropped area contents onto the dancer head position. A video image integration system includes a video camera for capturing participant videos and a processor. The processor has a processor database module storing pre-recorded dancer videos, a face recognition module configured to identify participant head locations from the video camera and generated cropped areas based thereon, and a blender module configured to overlay the cropped areas onto the dancer videos to generate composite videos.

24 Claims, 12 Drawing Sheets

U.S. PATENT DOCUMENTS

| | | |
|---|---|---|
| 2003/0001846 A1 | 1/2003 | Davis et al. |
| 2003/0063105 A1 | 4/2003 | Agnew |
| 2005/0151743 A1 | 7/2005 | Sitrick |
| 2007/0132780 A1 | 6/2007 | Garbow et al. |
| 2007/0171237 A1 | 7/2007 | Pinter |

* cited by examiner

1. LPU SOFTWARE LAUNCHED;

2. ENTER EVENT INFORMATION; ———————→ FIG. 2

2.4 ADJUST CHROMAKEY/DIGITAL MULLING & CROPPING;

2.5 SELECT PRERECORDED DANCER VIDEO FROM CHS DATABASE LIBRARY;

2.6 ENABLE EIGENFACE; ———————→ FIG. 3

2.7 SELECT VIDEO PARAMETERS (PARTICIPANTS/BACKGROUND/DANCERS;

2.8 LPU SOFTWARE MODIFIES AND ADJUSTS CHROMAKEY FACTORS USING EIGENFACE SOFTWARE; RECORD PARTICIPANTS AGAINST A GREEN SCREEN BACKGROUND AND CONCURRENTLY PLAY DATABASE VIDEO STREAM;

2.9 VIDEO STREAMS ARE MIXED IN LPU GRAPHICS;

2.10 RESULTANT DIGITAL INFORMATION RECORDED ON HD;

2.11 DIGITAL INFORMATION TRANSCODED FOR DVD USE;

2.12 DIGITAL INFORMATION TRANSCODED FOR USB AND WWW USE;

2.13 MEDIA GIVEN TO PARTICIPANTS.

FIG. 1

2.1 EVENT NAME RECORDED;

2.2 EVENT DATE RECORDED;

2.3 EVENT LOCATION RECORDED.

*FIG. 2*

2.6.1 LPU SOFTWARE MODIFIES AND ADJUSTS CHROMAKEY FACTORS USING EIGENFACE DETECTION SOFTWARE;

2.6.2 MODULE REVIEWS TOTAL TRAINING SET T;

2.6.3 MODEL CALCULATES THE MATRIX MEAN AVERAGE A;

2.6.4 MODULE SUBTRACTS THE MEAN FROM THE TOTAL; T-A=S 2.6.5 MODULE STORES THE RESULTS FOR VARIABLE S;

2.6.6 MODULE CALCULATES THE COVARIANCE MATRIX M;

2.6.7 MODULE CALCULATES THE EIGENVECTORS OF M;

2.6.8 STORES AS Y VARIABLE;

2.6.9 MODULE CALCULATES THE EIGENVALUES OF M;

2.6.10 STORES AS X VARIABLE;

2.6.11 COMPARE THE SUM OF X + Y WITH THE CAMERA IMAGE I;

2.6.12 SELECT THE PRINCIPAL COMPONENTS X' + Y' TO CREATE AN EIGENIMAGE;

2.6.13 LOAD EIGENIMAGE TO LPU;

FIG. 3

3.1 RECORD RECORDING SESSION NUMBER;

3.2 RECORD CONTACT INFORMATION FOR PARTICIPANT 1 (NAME, AND ADDRESS, EMAIL OR PHONE);

3.3 RECORD CONTACT INFORMATION FOR PARTICIPANT 2;

3.4 RECORD CONTACT INFORMATION FOR PARTICIPANT 3;

3.5 RECORD CONTACT INFORMATION FOR PARTICIPANT 4;

3.6 RECORD CONTACT INFORMATION FOR PARTICIPANT m;

3.7 TRANSFER EVENT INFORMATION FOR RECORDING SESSION TO CENTRAL DATABASE;

3.8 COLLECT ALL INFORMATION FOR ALL RECORDING SESSIONS AT A PARTICULAR EVENT;

3.9 CREATE A MAILING LIST FROM THE DATA.

FIG. 4

SYSTEM, APPARATUS, SOFTWARE AND PROCESS FOR INTEGRATING VIDEO IMAGES

CROSS REFERENCE TO RELATED APPLICATIONS

This application is the §371 National Stage of International Application No. PCT/US08/76382, filed on Sep. 15, 2008, which claims the benefit of U.S. Provisional Application Ser. No. 61/033,863, filed on Mar. 5, 2008, the contents of which applications are hereby incorporated by reference in their entirety.

FIELD OF THE INVENTION

The present invention relates to techniques for integrating prerecorded and live video images.

BACKGROUND OF THE INVENTION

Digital technology has transformed motion pictures, television, news and sporting events and video games. Digital graphic systems can now incorporate live video feeds, film and digitally created video streams to create seamless images.

Methods that permit the real time replacement of the background portion of an incoming data stream are also known in the art. For example, a television viewer routinely sees a weather reporter standing in front of a map. However, the reporter is in fact standing in front of a blue or green screen, referred to as a chromascreen, with the reporter's image superimposed over a digital or film image of the map. These techniques are referred to as "Chromakey Technology" or "Digital Matting."

Chromakey Technology may also be used to insert indicia such as an image of a product or a trademark into a prerecorded scene. The insertion of such indicia requires the control of background and lighting to compensate for anomalies in the background luminescence and color. Computer technology is often used to facilitate the replacement of the blue screen with an alternative background. However, careful attention to details in the lighting and placement of the indicia is required to preserve the effect of the inserted indicia.

The above-described technologies have also been used to create simple music videos, in which the heads of participants replace the heads in a video of previously recorded professional dancers. It is known to use such videos for arcade attractions, special occasion videos, or trade show and convention promotional novelties. When making such videos, according to known techniques, the first step is to film the dancers performing to music with their heads fixed in place. This can be accomplished by simply constraining the movement of the dancers such as, for example, using a helmet attached to a support stanchion. The dancer video is recorded and stored in a video camera or Digital Video Disk (DVD). Second, the video is then edited to remove the video representations of the dancers' heads. As a third step, third party participants draped in green capes are recorded in front of a green screen so that only their heads are visible in locations corresponding to those of the dancers. Fourth, a copy of the dancer video is then recorded replacing the dancers' heads with those of the participants. This video may be recorded to be given to the participants as a novelty.

The method for making a music video as described above has several limitations. In order to make the video, the professional dancers are locked in a limited range of motion that can make them appear unnatural and the dancing constrained and unprofessional. A second problem is that the participants are also limited during the third step as to the range of movements they can undertake. If a participant strays too far from this range, a substituted head does not align with the designated dancer's body, and appears to "float" in the video.

Other problems occur due to the limitations of the Chromakey technology. For example, if a participant brings his or her hands out from under the drape, they will be recorded and "float" in the dance video. Further, the lighting used to record the dancers in the studio will not necessarily be the same as the lighting used when the participant is recorded. Lighting variations may prevent the seamless blending of the live images with the prerecorded dancers video. Finally, color variations in skin tones between the dancers and the participants cannot be corrected.

Using popular dance music for a superimposed video recording creates another problem. Unless the music is held under copyright by the system developer, royalties are owed to the copyright owner under the U.S. Copyright Act. These royalties may be payable to collective rights organizations, such as The American Society of Composers, Authors, and Publishers (ASCAP) or the Broadcast Music, Inc. (BMI), for example. In addition, the U.S. Copyright Act mandates that a video synchronization licensing fee be paid for each physical recording of these musical works such as on a DVD or video, for example. At the present time, there is no easy way to account for the number of recordings made or the amount of royalties due unless the vendor maintains paper records.

Further, if the system is used at a trade show or other marketing venue, there is no seamless way using the prior technique to add a product image or trademark into the video. In addition, there is no way to develop a database for collecting business contact information such as addresses, telephone numbers, or email addresses for future marketing opportunities unless it is maintained separately.

Eigenfunctions are algorithmic tools useful in a wide variety of applications. One such application is known as eigenface detection, also referred to as eigenface recognition, and has been described by Turk and Pentland in "Face recognition using eigenfaces," *Proceedings of the IEEE Computer Society Conference on Computer Vision and Pattern Recognition*, June 1991, pp. 586-591; and in "Eigenfaces for recognition," 3 *Journal of Cognitive Neuroscience*, 1991, pp. 71-86. Eigenface detection techniques are now being investigated for a variety of commercial and law enforcement applications including user verification, access control, crowd surveillance and enhanced human computer interaction.

SUMMARY OF THE INVENTION

This invention presents in one embodiment a novel video stream merging system, apparatus, software and method that permits one or more images such as one or more persons to be superimposed into a previously recorded video, for example a music video. However, the technology of this invention is not limited to the merging of two video streams or to music videos. The technology described can also be used for merging any combination of a pre-recorded film, a digital stream or a live video stream and for a variety of other inputs and applications.

The video stream merging system of the present invention comprises a Central Hub Server (CHS) operated, for example, by a system administrator or franchiser, and a local processing unit (LPU) that may, for example, be operated as a stand alone unit by a purchaser or franchisee referred to as an "Operator" having limited subscription access. The CHS is the situs where videos such as images of prerecorded dancers as described above are created, processed and stored, where the relational data tables associated with the videos are maintained and where administrative functions such as compliance with copyright laws and the payment of royalties, for example, are undertaken.

At the Operator level, the system allows an Operator to record live participants, to merge a live video stream of the participants with a stored video stream of the recorded dancers from the CHS, and to print or "burn" media on which to store the merged video. To access the LPU, the Operator preferably must use an encryption key, known as a dongle that is preferably upgraded using system software at predetermined time intervals. A significant aspect of the present invention is the utilization of eigenface detection techniques during the creation of the video and in post-processing. In the first instance, the eigenface detection capability permits the Operator to move the bodies in the video under the heads of the participants, thereby insuring good relative positioning. Use of eigenface detection techniques in post-processing permits the automatic marrying of a body to the head, significantly reducing set up times. Further, even if the position of the participants varies significantly, the eigenface detection techniques permit each face to be lined up in the set up phase with the corresponding body such that they are all vertically aligned. By scaling the bodies with the heads, the system creates the illusion that some participants are in the distance (perhaps as backup artists) and even permits the set up of a scene where one participant appears to be resting in the hand or on the shoulder of another participant.

The present invention also utilizes novel techniques for insuring that a participant's head stays on the associated body once the video begins by taking note of boundary locations that are not green and then utilizing that information to determine how the participant has moved. This permits adjustments to the bodies or the head locations to maintain their correct relative positioning. This technique can be utilized independently or together with the eigenface detection techniques described above.

To develop a digital dance video, the system employs two major video stream components: a background video and a video of the dancers. For example, an artist creates a virtual background against which the dancers will be featured using standard video graphics applications. This video may be repeated for each song recorded, or a library of backgrounds may be created and applied independently by the Operator.

In the present embodiment, a different background is created for each song to be performed and the backgrounds are arranged in a relational database table stored in the CHS and associated with a particular dance video. The desired background may be left as a selection to be chosen by an Operator when stored on the LPU as well.

Once the backgrounds are stored or independent of the development of those backgrounds, one or more dancers are recorded performing in front of a Chromakey screen to a particular song. By way of example, four dancers may be used. Where more than four dancers are needed in one video, the software is designed to replicate more dancers. Different dance routines are choreographed and performed for each song that is to be maintained in the library. Once recorded, the stored dance videos are processed using modules in the software described below.

As described above, maintaining the correct relative positioning becomes a challenge when the head of a live participant is superimposed on a moving dancer in a recorded digital video. A novel aspect of this invention is an innovative process using eigenface detection technologies. During post processing, each frame of the video is compared within an eigenface detector module that assigns coordinates to the location of the dancers' faces in each frame of the video. After all frames of a video are processed, a smoothing and error correction algorithm is run to remove false positive face matches, and to interpolate face locations in frames lacking face matches. Such anomalies can occur when a dancer is looking away from the camera during recording, or there is motion blur. Once the faces of the dancers are located, the position of each dancer's face in each frame of the video is logged in a data table. This enables the software to know the exact location of each dancer's head in each frame, providing several operational and processing benefits, including giving the dancers creative freedom without artificial restrictions.

A content integration module allows the Operator to manipulate the placement, scaling, rotation and orientation of both the participants in the live video stream and the dancers in the digital video stream. Complementary to this feature, the system provides a module that permits the computer to track the movements of each participant and compare them with the movements of the corresponding pre-recorded dancer so that the participant can have a greater range of motion than was formerly available using prior art techniques. Known as PERFECT POSITIONING™, the module uses the eigenface detection system to place an electronic "lasso" around the head of a participant. This permits the participant to move his or her head freely with the dancer's digital body following the participant's head in a natural fashion. In the past, the participant was required to watch the prerecorded dancer video and attempt to mimic the head movements of a dancer.

A second and complementary module, called ON STAGE RIGHT™, allows the video representation of a dancer to be placed under the chin of a corresponding participant and to track the participant's movements. The advantages of this dual tracking system are that the two video streams are more realistically merged and the number of participants is only limited by the finite space in the field of vision of the camera recording the participant session, and gives unlimited flexibility in the choice of the number and types of dancer bodies.

Another module called the "BRANDING SUITE™ permits trademarks and product images to be placed in the digital video stream. Each "branding" image can be manipulated for placement, scaling, rotation and orientation.

The database system resides at two levels, a central hub server operated by a licensor and at an Operator level having limited subscription access to the CHS via an encryption key, known as a dongle that is used as an "ignition" key to start the Operator's system.

The system provides a means of encrypting selected digital video information so that a plurality of prerecorded digital recordings may be accessed.

The system also provides a method for collecting information about participants for advertising and promotional purposes and a method for recording uses of copyrighted music or film for reporting for royalty purposes.

According to an embodiment of the present invention, a process for integrating video images includes generating a dancer video with a dancer and identifying a dancer head position of the dancer in the dancer video. A participant head location is identified and a cropped area is generated based on the participant head location. A participant video is generated of cropped area contents and a composite video is generated by overlaying the cropped area contents onto the dancer head position.

According to another embodiment of the present invention, a video image integration system includes a video camera for capturing participant videos and a processor. The processor has a processor database module storing pre-recorded dancer videos, a face recognition module configured to identify participant head locations from the video camera and generated cropped areas based thereon, and a blender module configured to overlay the cropped areas onto the dancer videos to generate composite videos.

These and other objects, aspects, features and advantages of the present invention will be better understood in view of the drawings and the following detailed descriptions of preferred embodiments.

BRIEF DESCRIPTION OF THE DRAWINGS

FIG. 1 is a flowchart illustrating the system, apparatus and process of the present invention utilized in merging a prerecorded video with live video.

FIGS. 2 and 3 are flowcharts related to FIG. 1 by reference.

FIG. 4 is a flowchart illustrating ancillary processing features of the present invention that permits among other things, the creation of numerous reports.

DETAILED DESCRIPTION OF PREFERRED EMBODIMENTS

Figure 5:
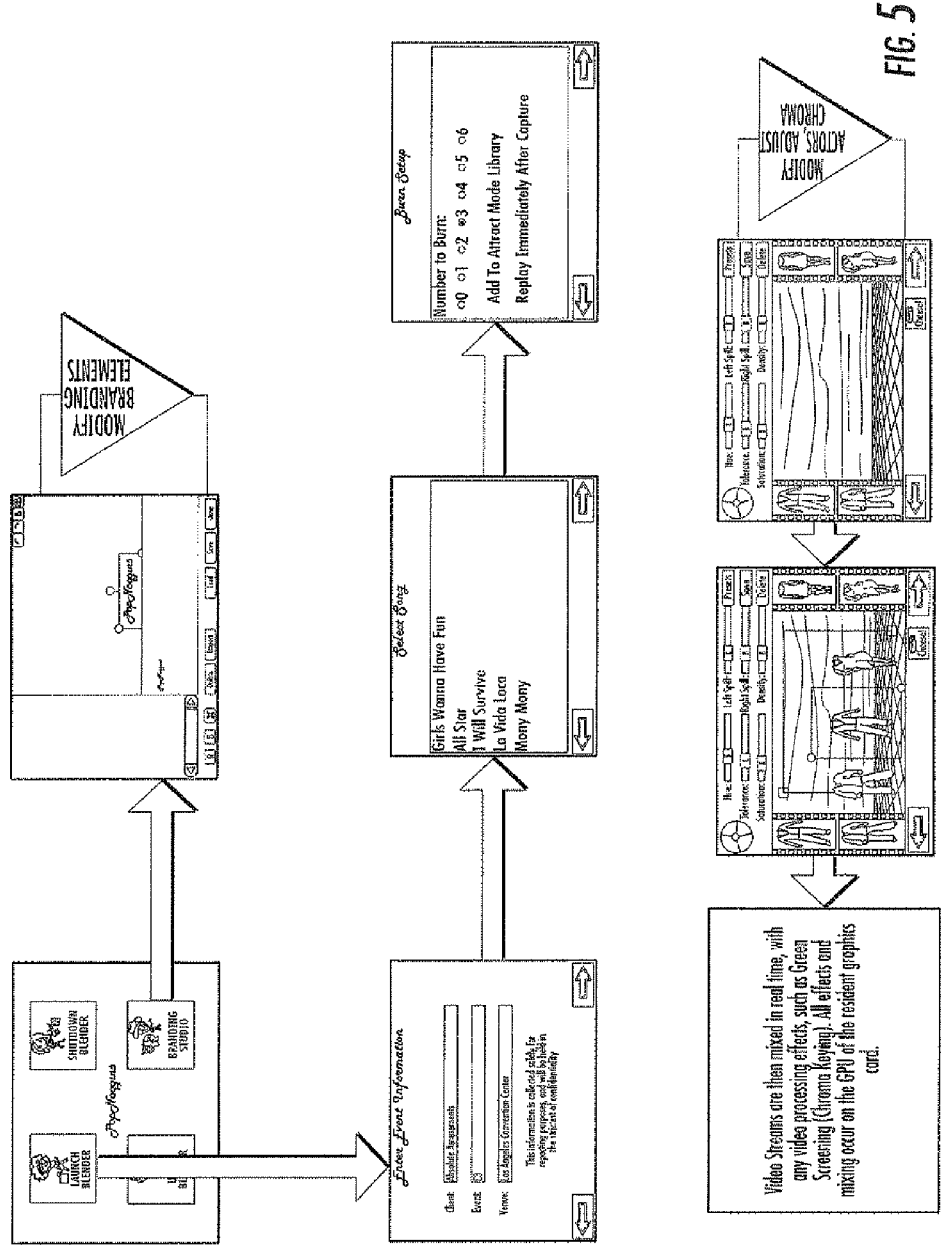
FIG. 5 is a flowchart illustrating the overall flow of video in accordance with the present invention.

One embodiment of the present invention described in the context of a novelty music video comprising a merger of a prerecorded dancer video and a recently-recorded participant video is described in the flowcharts of FIGS. 1-4 where the steps of the inventive process are sequentially numbered. The manner in which these two video components are created and brought together is described next.

Dancer Video

There are two major video components that comprise the dancer video: the background portion and the dancer portion. For example, six dancers are recorded in a studio in front of a green screen for each song, and one background is produced from digital content. The two portions are then integrated as the dancer video. Utilizing cropping avoids the necessity for a forescreen.

Participants' Video

The participants' video is created in a live recording session in which the participants wear green capes from the neck down and move about in the front of a conventional Chromakey screen preferably using cropping to control that portion of the green exposed during recording.

Merging of Two Videos and Post-Process

To achieve a seamless merging of the two videos, eigenface detection techniques and eigenimage analyses are utilized. To generate an eigenface set, a large set of digitized images of human faces, taken under the same lighting conditions, are normalized to line up the eyes and mouths. They are then all resampled at the same pixel resolution. An eigenface set can be extracted out of the image data by means of a mathematical tool called principal component analysis (PCA). The steps involved in converting an image of a face into eigenimages is illustrated in FIG. 3 and include:

A. Prepare a training set. The faces constituting the training set T should be already prepared for processing.

B. Subtract the mean. The average matrix A has to be calculated and subtracted from the original in T. The results are stored in variable S.

C. Calculate the covariance matrix.

D. Calculate the eigenvectors and eigenvalues of this covariance matrix.

E. Choose the principal components.

There will be a large number of eigenfaces created before step 5, and far fewer are really needed. The ones selected are those having the highest eigenvalues. For instance, if a resultant 100×100 image is achieved, then this system will create 10,000 eigenfaces. Since most individuals can be identified using a database with a size between 100 and 150, most of the 10,000 can be discarded, and only the ones with the highest eigenvalue are retained.

The eigenfaces that are created will appear as light and dark areas that are arranged in a specific pattern. This pattern is how different features of a face are single out to be evaluate and scored. There will be a pattern to evaluate symmetry, if there is any style of facial hair, where the hairline is, or evaluate the size of the nose or mouth. Other eigenfaces have patterns that are less simple to identify, and the image of the eigenface may look very little like a face.

Basically, eigenfaces are a set of "standardized face ingredients", derived from statistical analysis of many pictures of faces. Any human face can be considered to be a combination of these standard faces. For example, your face might be composed of 10% from eigenface 1, 55% from eigenface 2, and even −3% from eigenface 3. The values connecting a face to an eigenface can be anywhere from 100% to −100%, the higher the value, the closer the face is to that eigenface. Remarkably, it does not take many eigenfaces summed together to give a fair likeness of most faces. Also, because a person's face is no longer recorded by a digital photograph, but instead as just a list of values (one value for each eigenface in the database used), much less space is taken for each persons face. Specifically, using this approach will use ¹⁄₁₀₀₀th of the digital storage space that the full size digital image would require.

During post processing various irregularities are addressed. Color is corrected and the video is recompressed. In addition eigenface detection technology is applied by having each frame of the merged video run through an eigenface detector and the location of each face is stored with each frame. After all frames of a video are processed, a smoothing and error correction algorithm is run to remove false positive face matches and interpolate face locations. Further, frames lacking face matches can be corrected which occurs infrequently if a subject is looking away from the camera or if there is a motion blur. Once the faces of the dancers are located, another process is run over the video that moves each frame's position such that the detected face is pinned at a predetermined location. This effectively 'floats' the feet, and pins the head. This does a couple of things: makes it quite easy to remove the head from the dancer video (in preparation for superimposing the participant's head), and makes it easy for a participant to keep their head correctly positioned above the body, thereby adding to the suspension of disbelief.

Another added benefit here is that it affords the dancers creative freedom, as opposed to imposing some artificial restriction on their movement.

After the raw video streams have been processed as described above, they are loaded on to a Blender. Because each person has a different height and build, and because the chairs shift around during use, it cannot be guaranteed that the participant's heads will be at a known location. Because of this, the facility is provided for the technician operating the Blender to move the bodies under the heads of the participants, thereby ensuring good relative positioning. Without this capability, the tech would necessarily be required to raise or lower chairs, reposition participants, and the like to achieve the same effect. This achieves greater accuracy, speed, capacity and participant comfort.

By applying the same face finding algorithm used during the post processing step, the location of the faces of our participants can be determined. Once these faces are located, they can be automatically married to the body to the head, cutting down setup time even further.

In addition, this also gives us the chance to rearrange the heads, move them up or down, and resize them. Even if participants are standing up and their height varies wildly, we can detect the location of each face and line them up in the setup phase with the bodies such that they are all vertically aligned. By scaling the bodies along with the heads, we can create the illusion that some participants are in the distance (perhaps as backup singers), and even setup a scene where a participant might be a devil or angel on the shoulder of another participant.

An additional goal of the Blender software is to ensure that the participants' heads stay on the bodies once the video starts. Of course, the eigenface detection algorithm could be used for this purpose. Alternatively, a different approach for the real time face positioning can be used. Because it is known that the participants are positioned in front of a green screen and that they are wearing green capes, the only part of any given frame that isn't green are the participants' faces. During the render phase of the previous frame, note is taken of bounded locations that are not green, and are used that to determine how the participant has moved. Based on that information, adjustments to the bodies or the head locations are made to maintain their correct relative positioning. As an enhancement, the eigenface detector can be intermittently run to ensure the faces are being tracked properly.

Instead of pinning the head down in the source videos, it is alternatively possible to simply detect the face positions and store them as data streams. Then, once the initial positioning is set up for the participants, the face locations can be tracked as the bodies move about in the source video. Thus, as the dancer performs, the head moves around with the correct body. It would be difficult to pin the head down with some performances, such as break dancing, where the dancer has a wide range of motion. Employing this technique would allow us some flexibility in supporting source content such as this.

There are other interesting creative applications. Instead of dancing bodies, famous movie clips or sports videos can be used. As the subjects move about the scene, the participants' heads will track with the correct body.

The present invention contemplates the use of a hardware key (dongle) to protect application and content in various capacities and levels. The preferred dongle has non-volatile memory that can store minimal information, and also has a built in real time clock that can be used for a dependable report of the date and time.

The first line of defense is to ensure the user has a dongle attached to the system. Because each system ships with one dongle, if the user tries to make a clone of the system and software, only one system at a time can be run. The driver of dongle produces a challenge that is sent to the dongle. If the challenge is answered correctly (based on the internal hardware encryption methods), then the software loads.

Because this system deals with source content that require royalties, content must also be protected. To this end, the content on the hard drive is encrypted by again using the dongle's hardware encryption/decryption functionality.

As discussed above, the preferred dongle has non-volatile memory used to store various bits of information, and also has a built-in real time clock we use. Preferably, also the Blender Update is run at regular intervals; this is an application that resides on the Blender and communicates with the CHS to determine if all the software and data are up to date, and computes a message digest for each file (MD5), and sends that to the CHS. The CHS has the digests computed for all of its files, and compares the two. If any differences are encountered, the CHS requires the Operator's location to download the differences, delivered by an RSync type algorithm that uses a rolling checksum to compare blocks of a fixed size within each file.

Additional things preferably occur during a Blender Update. Firstly, memory on the dongle is used to store the last date and time the update was completed successfully (using the date and time reported by the dongle). This allows the reliable reading of the dongle information and permit a determination exactly how long it has been since the Operator client has run its updater. If too much time has passed, a warning may be issued, or the Operator required to run the Blender Update before continuing. During the update, the Operator reports to the CHS all the media that has been played since the last update. The CHS takes this and logs it in a master database for that Operator. The combination of these two actions ensures receipt of regular reports of the media that has been played and allows the CHS to generate reliable reports on the same. These reports can be for internal purposes, or shared with the licensing bodies as to content.

Figure 6:
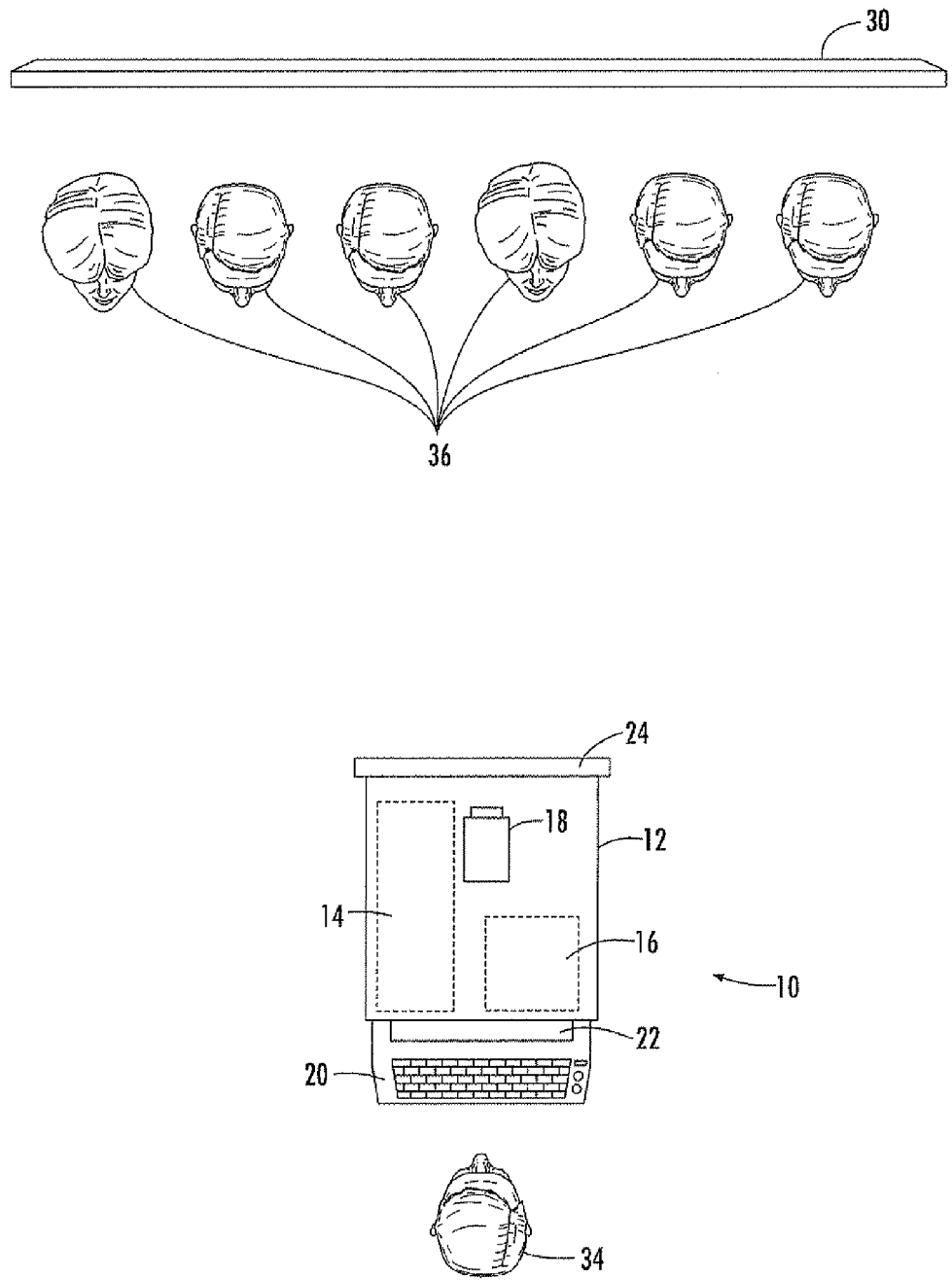
FIG. 6 is an overhead physical layout schematic view of a video entertainment system in accordance with an embodiment of the present invention, with hidden components shown in broken lines.
Figure 6A:
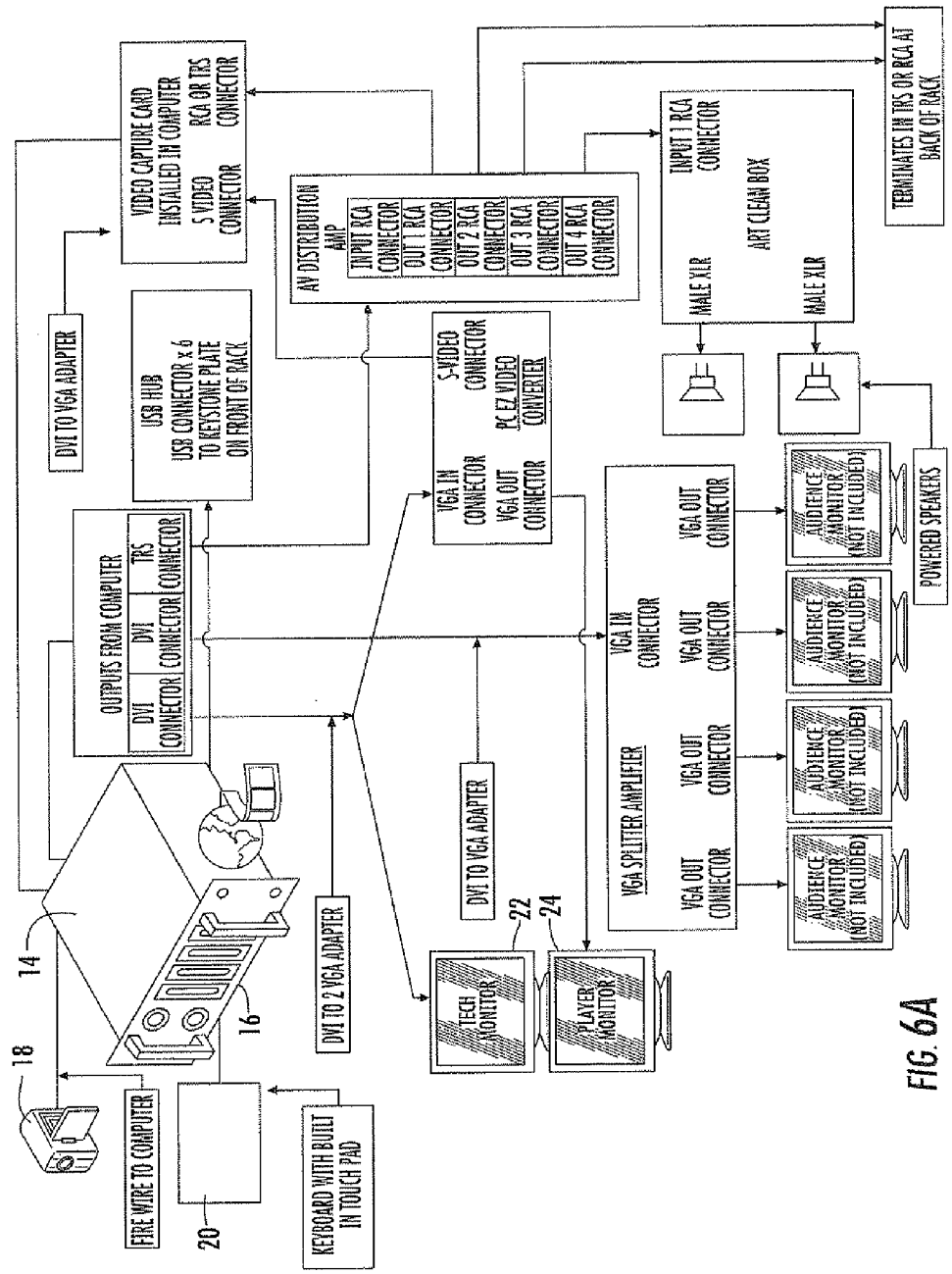
FIG. 6A is a connection diagram of components of the video entertainment system of FIG. 6.

Referring to FIGS. 6 and 6A, one embodiment of a video entertainment system 10, utilizing the video stream merging system, apparatus, software and method described above, includes a cabinet 12. The cabinet 12 is preferably a mixer rack or similar wheeled rack adapted for holding a plurality of electronics components. The cabinet 12 accommodates an LPU 14 and a multi-DVD recorder or (burner) 16. The LPU 14 includes the Blender and related modules for use by the Operator, as described above. The recorder 16 preferably is equipped with multiple drives allowing a DVD to be burned for each participant simultaneously. A wide-angle camera 18 is arranged on top of the cabinet 12, and can be stored within the cabinet 12 when not in use. A technician interface 20, such as a keyboard and trackball, selectively slides in and out of the cabinet 12. A technician monitor 22 is mounted to the cabinet 12 above the operator interface 20. A larger participant monitor 24 is mounted on an opposite side of the cabinet 12. Preferably, both monitors 22, 24 can be dismounted and stored within the cabinet 12 to facilitate transportation of the system 10 from one entertainment venue to another. The video entertainment system 10 further includes a chromakey, or "green," screen 30.

In operation, a technician 34 sits in front of the operator interface 20, while a plurality of participants 36 sits in front of the screen 30, such that all each participant 36 comes within the range of the camera 18. As described above, each participant 36 wears a green cape. The technician 34 uses a dongle to access the LPU 14, enters a music selection to accompany to the video, enters a background selection, and enters dancer video selections for each of the participants. Any branding that is to be displayed in the video is also selected by the technician 34. The technician 34 can make each of these selections himself, or allow the participants 36 or another person or group to make some or all of the selections.

Using eigenface detection, the face of each participant 36 is automatically located. The technician 34 will see the recognized faces on the technician monitor 22, and can re-run the eigenface detection if a face has been improperly recognized. A crop is set around each face to narrow the video field being captured of each participant 36. If the participant 36 is wearing a green cape 52 (shown in broken lines), a square or rectangular crop 50 (see FIG. 7) can be set since the chest and shoulders will not appear in the steam. As will be described in additional detail below, crops of other shapes or sizes can be used, and the crop can also be custom set by the technician 34. The technician 34 uses the blender on the LPU 14 to match each participant 36 face to the corresponding dancer body in the dancer video streams, and can make further adjustments to the participant and dancer video streams, as described above.

Once the technician 34 is satisfied with the blending of the various streams, the music track can be started and the composite video is recorded while the participants 36 watch their faces mated to the dancer's bodies on the participant screen 24 and interact within the context of the composite video. One or more additional monitors (not shown) can be used to broadcast the composite video to other viewers. After the composite video is complete, the technician 34 distributes a DVD to each participant 36 from the DVD recorder 16.

Additionally, the technician supplies a web address which participants 36 can visit to view the composite video over a network, such as the Internet. The composite video can be uploaded to the Internet using a Leap2Web-type format. The composite video can also be streamed in real-time or near real-time over the Internet. Royalty and payment information can be maintained at the CHS.

Figure 8:
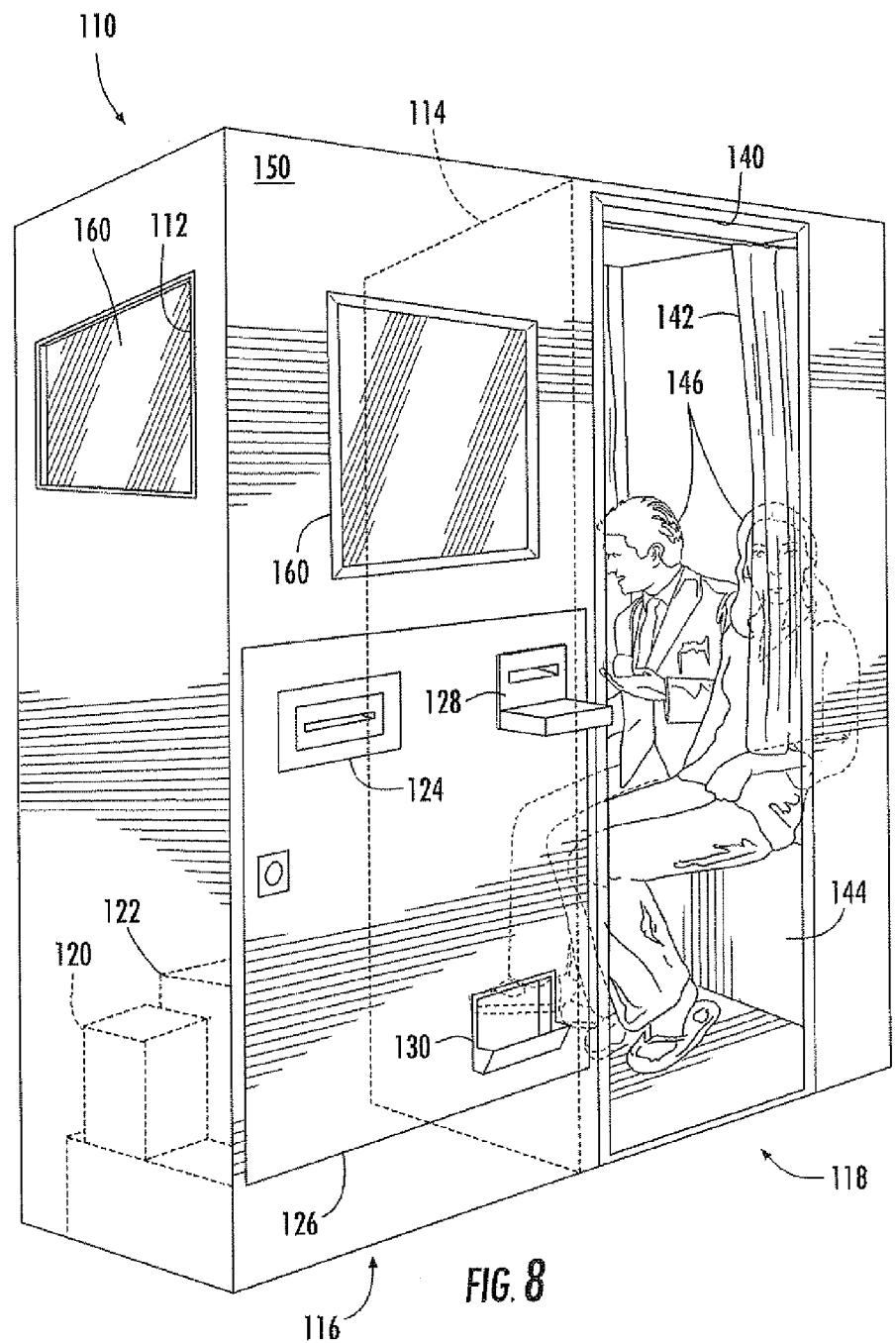
FIG. 8 is a perspective physical layout schematic view of a video entertainment system according to another embodiment of the present invention, with hidden components shown in broken lines.
Figure 9:
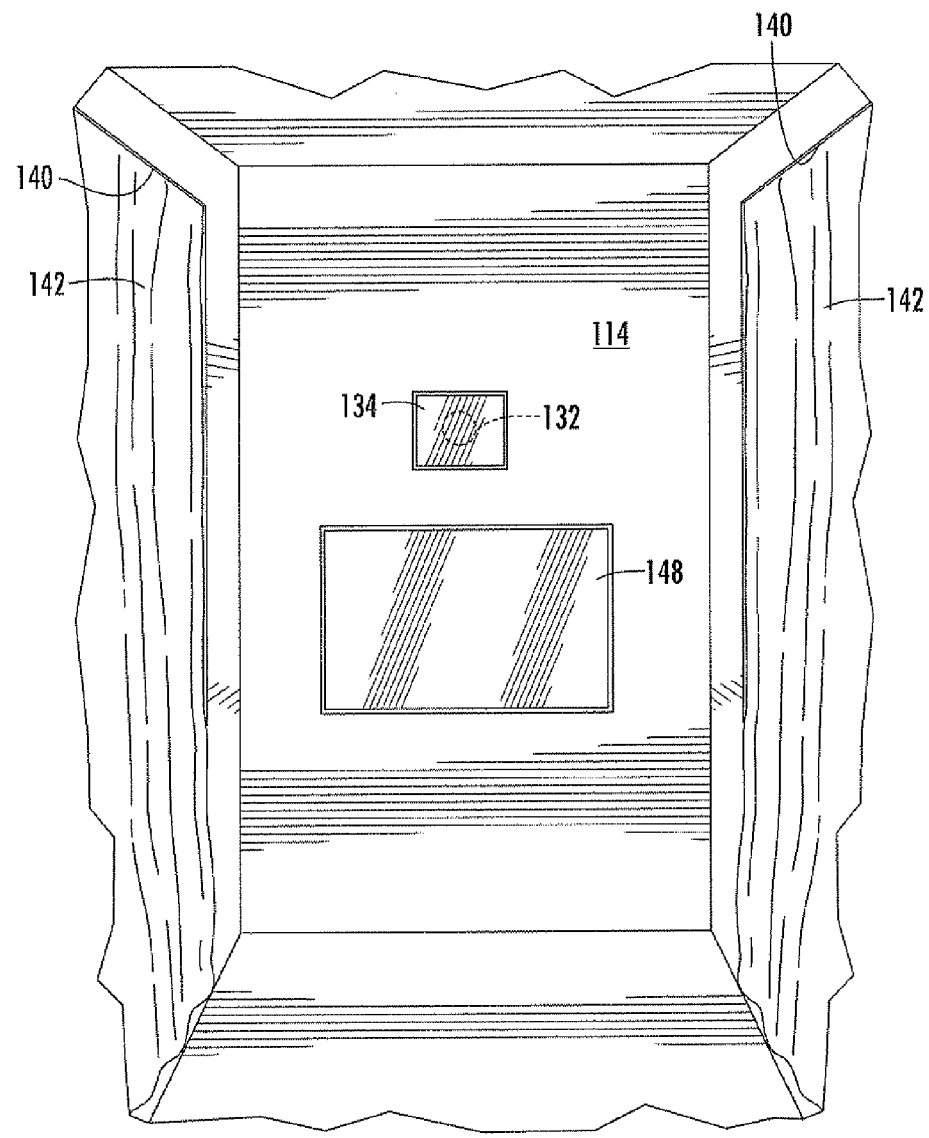
FIG. 9 is a perspective schematic view of a portion of the video entertainment system of FIG. 8.
Figure 9A:
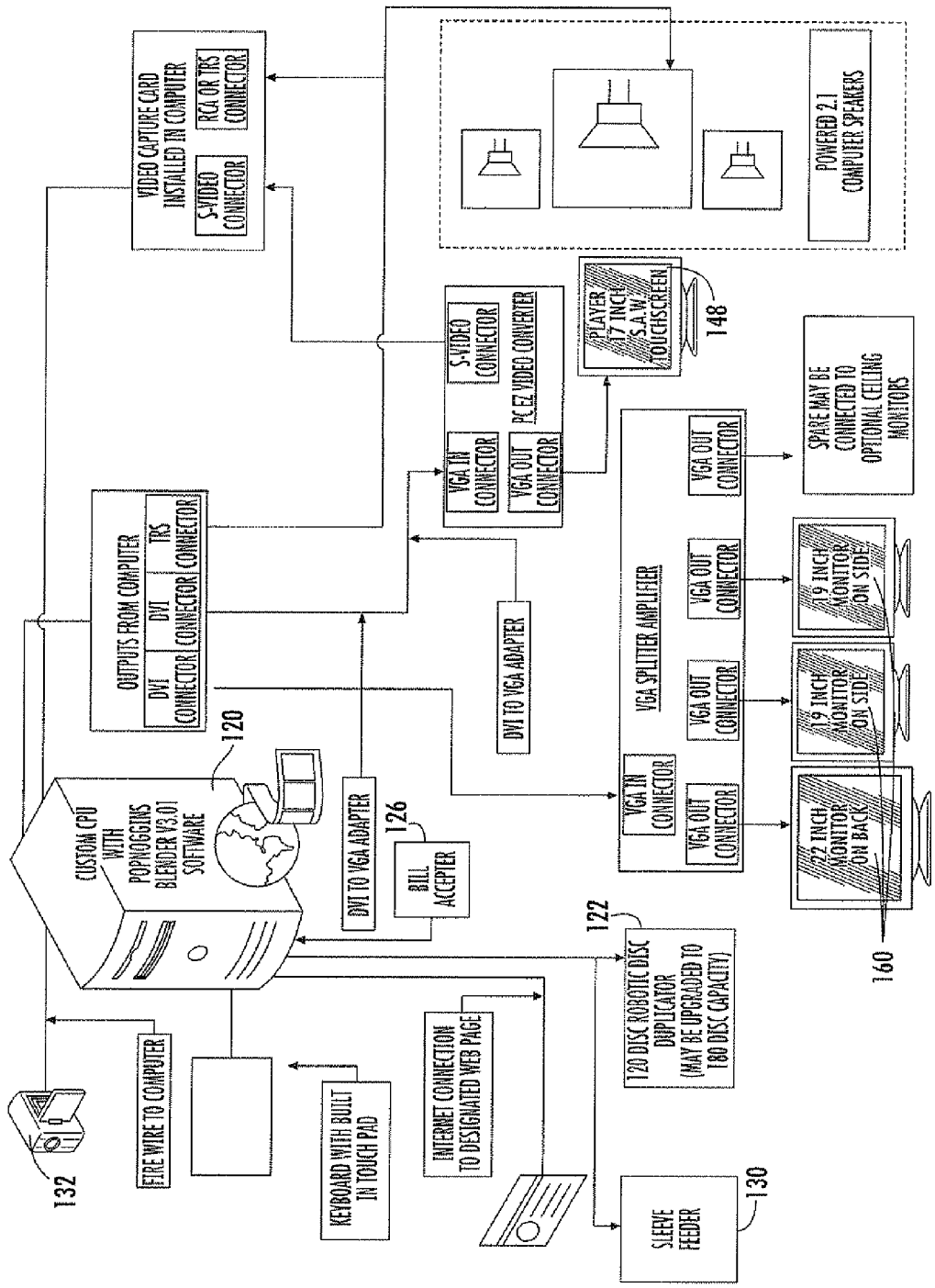
FIG. 9A is a connection diagram of components of the video entertainment system of FIGS. 8 and 9.

Referring to FIGS. 8-9A another embodiment of a video entertainment system 110, utilizing the video stream merging system, apparatus, software and method described above, includes a booth 112. The booth 112 is similar in size to a photo booth and divided by a central wall 114 into an equipment area 116 and a participant area 118.

The equipment area 116 accommodates an LPU 120, DVD recorder/auto-handler 122, and a bill accepter 124 for accepting cash, credit card, or other payment types. The equipment area 116 is accessed by at least one door 126, adapted for secure locking. DVDs processed by the recorder/auto-handler 122 are ejected outside the booth 112 into a chute 128, where the DVDs can be taken by participants. A sleeve feeder 130 ejects sleeves to cover and protect the ejected DVDs. A wide-angle camera 132 is also accommodated in the equipment area 116. The wide-angle camera 132 is directed toward the participant area 118 through a one-way mirror 134, or other window, in the dividing wall 114.

The participant area 118 is accessed by a pair of opposed doorways 140 that are selectively closeable with curtains 142. A bench 144 is arranged in the participant area 118, such that a number of participants 146, for example up to two, are able to sit facing the dividing wall 114 and the camera directed therethrough (see FIG. 9). A touch screen monitor 148 is located on the dividing wall 114, allowing participants 146 to view instructions, make inputs and view the composite video while it is being made. A rear wall 150 of the participant area 118 is green and serves as a chromakey screen.

Monitors 160 are arranged outside the booth 112, to allow spectators to view composite videos generated by the system 110, generating additional interest in the area of the booth 112. Other monitors can be arranged on other sides of the booth 112, in addition to, or in place of, the monitors 160.

In operation, the participants 146 use the bill accepter 124 to pay for operation of the system 110, enter the booth 112 through the doorways 140 and draw the curtains 142. The monitor 148 instructs the participants to remain still while face recognition is in progress. The camera 132 begins operating and the participants 146 can see themselves on the monitor 160 while the LPU 120 runs the eigenface detection. The participants 146 are shown the detected faces on the monitor 160 are queried in the detected faces are correct. The participants 146 respond by using the touch screen monitor 148. If the faces have been detected incorrectly, eigenface detection is re-run. If the faces have been detected correctly, then the participants 146 are queried to select other video options, including a video background, dancer's bodies, and music.

The participants 146 are notified that recording will begin and the music begins to play. The participants 146 can view the composite video on the monitor 148 as it is being recorded, and any spectators can also see the video on the monitor 160. Once the recording is complete, the participants 146 are instructed to vacate the booth 112 and take their DVD and sleeve. The DVD autohandler 122 ejects the DVD into the chute 128 and the sleeve feeder 130 ejects a sleeve, such that a DVD and sleeve are available for the participants 146 upon exiting the booth 112. Additionally, a web address for accessing the composite video on the Internet can be supplied to the participants 146, as described in connection with the system 10, above.

Preferably no technician is required to operate the system 110 with the booth 112, reducing expenses and increasing ease of use. However, certain functions performed by a technician must be automated or eliminated. For instance, without a technician it is difficult to ensure that the participants 146 will properly wear capes, or even that any capes provided with the booth 112 will remain in good and repair and available for use. Thus, it is preferred that no capes be worn by participants using the booth 112.

Figure 7:
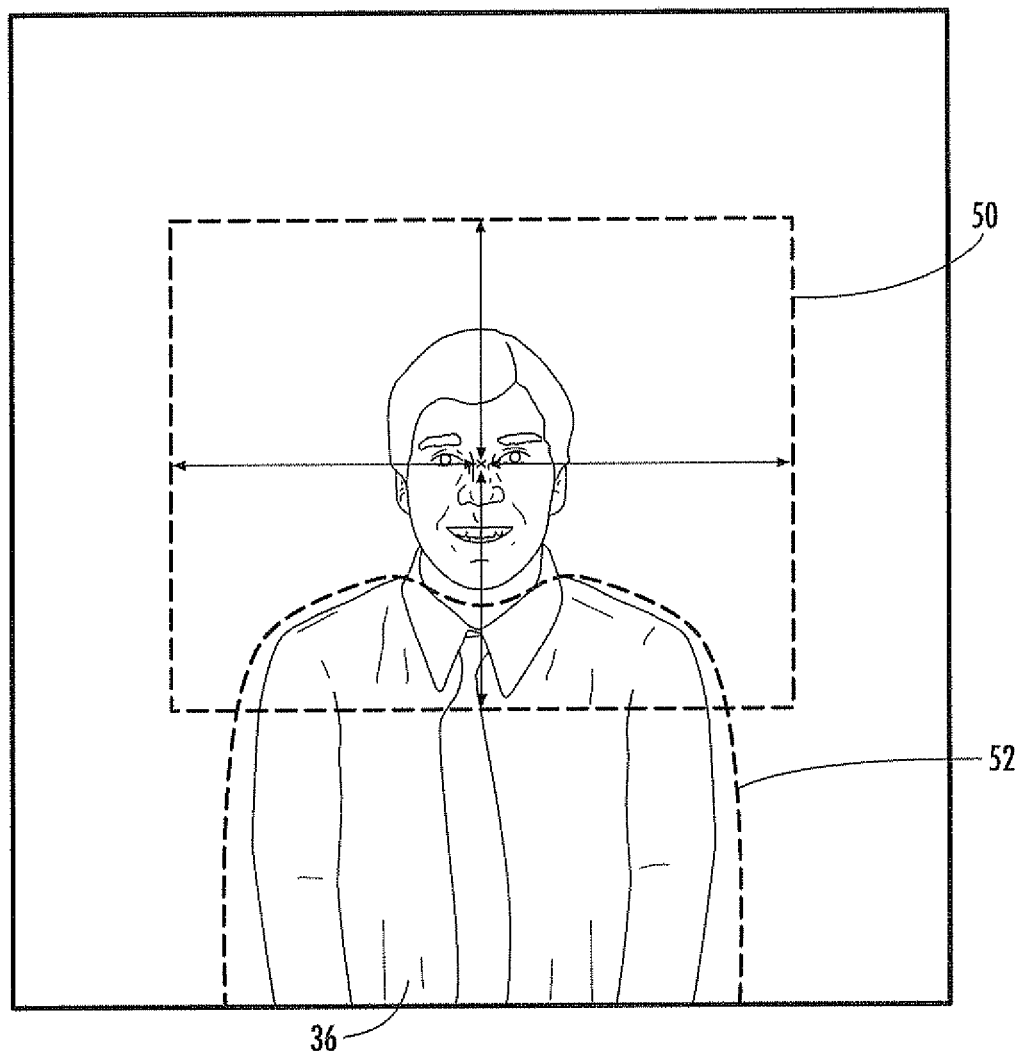
FIG. 7 is a view of screen illustrating a crop utilized by the video entertainment system of FIG. 6.
Figure 10:
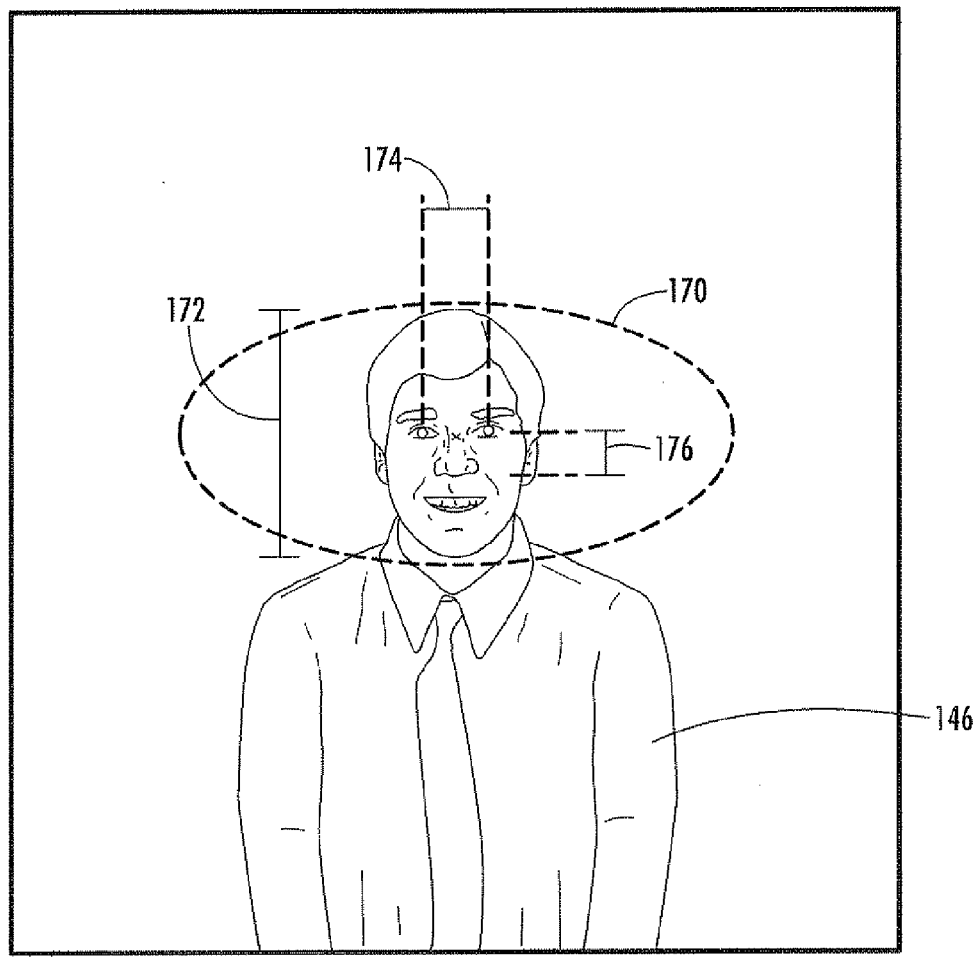
FIG. 10 is a view of screen illustrating a crop utilized by the video entertainment system of FIG. 8.

As shown in above in connection with FIG. 7, an automatically set square crop 50 centered on the detected face will often include portions of a participant's clothed shoulders and chest, which will appear improper in the composite video. Accordingly, referring to FIG. 10, a crop 170 should be set that closely cuts under the chin of the participant 146 to avoid capturing the shoulders and chest of the participant 146 in the video. An oval shape, as shown, for the crop 170 is advantageous because some lateral movement of the head of the participant 146 will still be captured within the crop 170 once recording begins.

Since there is no technician to size the crop 170 to match the height 172 of the head, the LPU 120 automatically determines the height of the participant's face. While eigenface detection will identify the location of a face, the height 172 from the top of the forehead to the bottom of the chin is not ascertained, and the crop can be properly sized to cut just under the chin. Accordingly, a face height determination routine is run. Eigenfaces can be broken down into discrete eigenfeatures, or distinct facial regions, just as a face can be divided into different elements, such as a forehead, eyes, nose, mouth, and the like. Eigenfeatures are analogous to, through not necessarily identical with, facial features.

The present inventors have determined a useful method of face height determination is to determine the distance between one or more sets of readily identifiable eigenfeatures. The ratio of the distance between the set of eigenfeatures and the height 172 will be roughly constant for a given facial type. To make an analogy to an actual face by way of example, referring to FIG. 10, in faces of a type where the distance 174 between the eyes in roughly equal to the distance 176 between the eyes and the bottom of the nose, the average ratio of the distance 174 between the eyes to the height 172 of the face is approximately 1:5. Thus, the height of the crop 170 based on a face height 172 that is approximately five times greater than the distance 174 between the eyes.

To obtain the ratios to be used in the face detection routine, a training set of faces is analyzed to evaluate the optimal eigenfeature relationships to determine facial type. For each facial type, the average ratio between the distance between eigenfeatures and face height is determined. Preferably, only enough facial types are used to ensure that the face height 172 in the training set is sufficiently closely determined that the crop 170 is properly sized to cut the shoulders and chest without cutting any of the face. Additionally, since the bottom center of the crop 170 corresponds to the chin of the participant 146, the crop 170 can also be used as a point of reference to auto-locate the cropped head of the participant 146 over the pre-recorded dancer's body.

While the face height determination routine described above is particularly advantageous in the context of the system 110, in which no technician is available to manually set the crop or ensure proper alignment of the participants head over the body of the pre-recorded dancer, it will be understood that the face height determination routine can also be utilized in connection with the previously-described system 10, as well as other embodiments and variations of the present invention.

In certain applications, however, where booth dimensions result in the presence of two participants with heads in close proximity, the above-described detection routine may result in the false detection of two faces as a single face. At the same time, the narrow confines of such booth dimensions will tend to limit the range of motion available to participants. An advantageous detection routine in such a situation is to use the distinction between the green background and the participants faces to identify the faces.

The participants can be initially prompted to identify the number of participants (e.g., one or two). The processor then knows how many faces to identify. The identification can be accomplished by initially scanning pixels in a captured image of the participants along the x-axis, within a predetermined range of pixels in the y-axis (based on a reasonable range of possible face positions), and counting green versus non-green pixels. The crop is then set around the averages masses of non-green pixels. A fixed crop, such as an arc is used to cut across the neck so that the chest and shoulders are not included within the crop.

If the two participants heads are very close or touching, such that there are not two readily identifiable masses of non-green pixels, the processor will split the mass in half where the non-green pixel areas converge. The processor can give the participants a chance to indicate if the captured faces are correct before proceeding, which, if the split between closes faces is unsatisfactory, may naturally lead to the participants separating somewhat before the faces are recaptured and the crop is reset. Once the crops are satisfactory, the video image inside the crop will remain centered on the dancers' heads during generation of the composite videos. Since the participants can see the video during generation, they can keep their faces within the crop, if desired.

Additionally, if a single participant inadvertently selects that multiple participants (e.g., two) will be captured, when the processor locates only a single face the image in the cropped area can be automatically reproduced and placed on top of the additional (e.g., second) dancer(s) in the composite video.

Also, for entertainment value, the participants can select varying head sizes, such that the image within the crop is scaled up or down when placed in conjunction with the body. Thus, the participants can have disproportionately large or small heads relative to the size of the pre-recorded dancers' bodies.

Naturally, some or all of the modifications can also be applied in the context of the technician supervised system. In connection with both systems, in addition to tracking royalties and the like in connection with the playing of the videos, further records can be tracked, such as dancer body selections and the like.

The above description when read together with the accompanying drawings will clearly enable one skilled in the art to understand and appreciate the inventions embodied herein. It also will be understood by those skilled in the art that a variety of modifications and improvements may be made in the system, apparatus, software and processes of this invention including, for example, the utilization of a master video file to maintain in storage copies of all of the final work product described above.

What is claimed is:

1. A process for integrating video images comprising:
   generating a dancer video with a dancer;
   identifying a dancer head position of the dancer in the dancer video;
   identifying a participant head location;
   generating a cropped area based on the participant head location;
   generating a participant video of cropped area contents; and
   generating a composite video by overlaying the cropped area contents onto the dancer head position;
   wherein the process further comprises generating a background video and generating a composite video further includes overlaying the dancer body and cropped area contents onto the background video;
   wherein a plurality of dancer videos are generated including a plurality of dancers; and
   wherein a plurality of participant head locations are identified and a plurality of cropped areas are generated, and generating the composite video includes overlaying contents of the plurality of cropped areas over respective head locations of the plurality of dancers.

2. The process of claim 1, wherein the dancer head position is used to pin the dancer head in a fixed position in the composite video.

3. The process of claim 1, wherein the participant head location is determined using eigenface detection.

4. The process of claim 3, wherein the cropped area is generated based on eigenfeature comparison.

5. The process of claim 1, wherein the locations of the plurality of dancers in the composite video are individually selected.

6. The process of claim 2, wherein a shape of the cropped area is customized.

7. The process of claim 1, wherein the composite video includes audio content.

8. The process of claim 7, wherein the audio content is selected.

9. The process of claim 8, wherein a record of the selected audio content is stored.

10. A process for integrating video images comprising:
generating a dancer video with a dancer;
identifying a dancer head position of the dancer in the dancer video;
identifying a participant head location;
generating a cropped area based on the participant head location;
generating a participant video of cropped area contents; and
generating a composite video by overlaying the cropped area contents onto the dancer head position;
wherein identifying the dancer head position includes employing eigenface detection to frames of the dancer video; and
wherein interpolation is used to identify dancer head position in frames where eigenface detection is unsuccessful.

11. A process for integrating video images comprising:
generating a dancer video with a dancer;
identifying a dancer head position of the dancer in the dancer video;
identifying a participant head location;
generating a cropped area based on the participant head location;
generating a participant video of cropped area contents; and
generating a composite video by overlaying the cropped area contents onto the dancer head position;
wherein the participant head location is determined by scanning for non-chromascreen-colored pixels.

12. The process of claim 11, wherein the scanning is performed in an x-direction over a predetermined y-axis range.

13. A process for integrating video images comprising:
generating a dancer video with a dancer;
identifying a dancer head position of the dancer in the dancer video;
identifying a participant head location;
generating a cropped area based on the participant head location;
generating a participant video of cropped area contents; and
generating a composite video by overlaying the cropped area contents onto the dancer head position;
wherein the cropped area contents are scaled based on a size of the dancer.

14. A process for integrating video images comprising:
generating a dancer video with a dancer;
identifying a dancer head position of the dancer in the dancer video;
identifying a participant head location;
generating a cropped area based on the participant head location;
generating a participant video of cropped area contents; and
generating a composite video by overlaying the cropped area contents onto the dancer head position;
wherein a plurality of dancer videos are generated including a plurality of dancers;
wherein a plurality of participant head locations are identified and a plurality of cropped areas are generated, and generating the composite video includes overlaying contents of the plurality of cropped areas over respective head locations of the plurality of dancers; and
wherein the sizes of the plurality of dancers in the composite video are individually selected.

15. A process for integrating video images comprising:
generating a dancer video with a dancer;
identifying a dancer head position of the dancer in the dancer video;
identifying a participant head location;
generating a cropped area based on the participant head location;
generating a participant video of cropped area contents; and
generating a composite video by overlaying the cropped area contents onto the dancer head position;
wherein a plurality of dancer videos are generated including a plurality of dancers;
wherein a plurality of participant head locations are identified and a plurality of cropped areas are generated, and generating the composite video includes overlaying contents of the plurality of cropped areas over respective head locations of the plurality of dancers; and
wherein the associations between the plurality of dancers and the plurality of cropped areas are individually selected.

16. A video image integration system comprising:
a video camera for capturing participant videos; and
a processor including:
a processor database module storing pre-recorded dancer videos;
a face recognition module configured to identify participant head locations from the video camera and generated cropped areas based thereon; and
a blender module configured to overlay the cropped areas onto the dancer videos to generate composite videos;
wherein the processor is further configured to replicate the contents of a given cropped area such that the contents of the given cropped area can be overlayed onto a plurality of dancer videos; and
wherein the processor is further configured to automatically replicated the contents of a given cropped area and overlay the contents of the given cropped area onto a plurality of dancer videos when a number of participants selected is less than a number of identified participant head locations.

17. The system of claim 16, further comprising a digital video disc (DVD) recorder for recording composite videos onto DVDs.

18. The system of claim 16, further comprising a hardware key, wherein the processor is configured to be fully utilizable only upon interface with the hardware key.

19. The system of claim 16, further comprising a server remote from the processor and configured for communication therewith.

20. The system of claim 19, wherein the processor is configured to be fully utilizable only if communication with the server occurs within a predetermined interval.

21. The system of claim 19, wherein the database module is further configured to store composite video information and the processor is further configured to communicate the composite video information to the server.

22. The system of claim 21, wherein the composite video information includes at least one of: associated audio content selection information and dancer video selection information.

23. The system of claim 22, wherein the composite video information includes associated audio content selection information and the server is configured to calculate royalty payment amounts based on the audio content selection information.

24. The system of claim 16, wherein the video camera and the processor are contained within a booth.

* * * * *